May 9, 1939.  T. C. WILLIAMS ET AL  2,157,684
APPARATUS FOR CLEANING AND OPENING COTTON OR LIKE FIBROUS MATERIAL
Filed Oct. 4, 1937  3 Sheets-Sheet 1
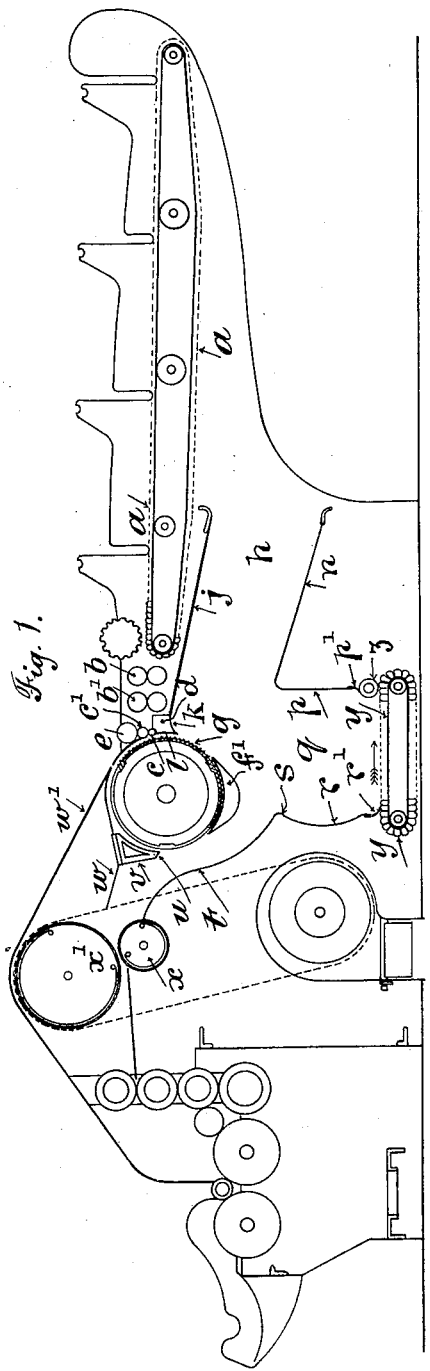
INVENTORS:
THOMAS CLIFFORD WILLIAMS
SYDNEY ALFRED SHORTER
BY: Francis E. Boyce
ATTORNEY

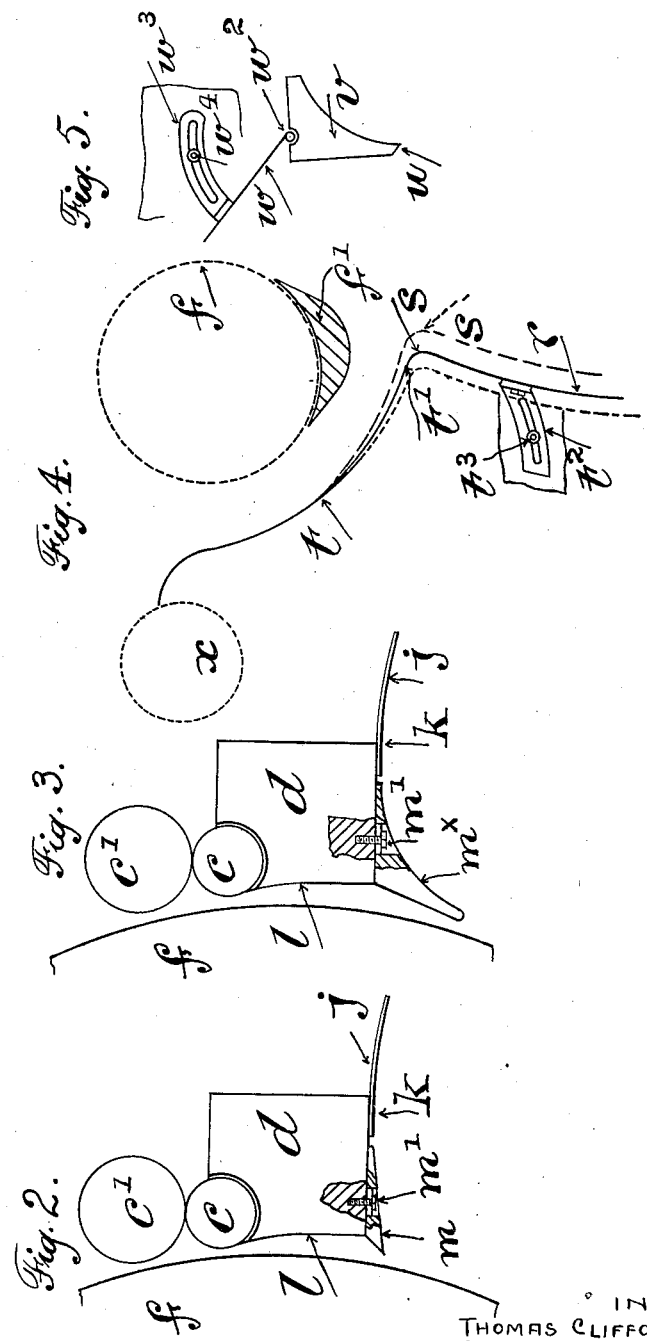

May 9, 1939.                T. C. WILLIAMS ET AL                2,157,684
APPARATUS FOR CLEANING AND OPENING COTTON OR LIKE FIBROUS MATERIAL
                Filed Oct. 4, 1937           3 Sheets-Sheet 3

INVENTORS:
THOMAS CLIFFORD WILLIAMS
SYDNEY ALFRED SHORTER
BY: Francis E. Boyce
                ATTORNEY Patented May 9, 1939

2,157,684

UNITED STATES PATENT OFFICE 2,157,684

APPARATUS FOR CLEANING AND OPENING COTTON OR LIKE FIBROUS MATERIAL

Thomas Clifford Williams and Sydney Alfred Shorter, Didsbury, Manchester, England, assignors to The British Cotton Industry Research Association, Didsbury, Manchester, England Application October 4, 1937, Serial No. 167,158
In Great Britain October 22, 1936

7 Claims. (Cl. 19—89)

These improvements relate to machines for the opening and cleaning of cotton and similar fibrous material on a large scale, in which the material is fed by rollers, or dish or pedal feed mechanism, and acted on by a revolving beater situated over a dirt-box or settling chamber, and is transported to a cage or cages or a duct for further treatment or deposition in a bin or other storage place.

The object of our improvements is to provide a machine which, working at a high rate of production will enable cotton or similar fibrous material to be opened and conveyed in a determinate stream of air over a settling chamber in such a manner that the trash is deposited and the cleaned material carried forward.

We propose to use a spiked or toothed beater situated over a settling chamber, into the upper regions of which it strikes the material from a feed system. This beater consists of a drum with continuous cylindrical surface to which are fixed the spikes or teeth in known manner, the transporting current of air having thus no access to the space between this surface and the shaft or axle of the drum.

For feeding the material to the beater we propose to use some form of roller or dish feed which allows the spikes or teeth to strike it at a distance from where it is gripped, which is small enough in relation to the fibre length for the production of good opening, and yet not so small as to damage the fibres.

In order to control the manner in which the material is projected into the upper regions of the settling chamber we propose to use means for confining the material, after it is struck from the feed rollers, to the vicinity of the beater surface for a distance which may be adjusted to suit different kinds of material.

For the pneumatic transport of the material we propose to use some means of forward suction such as a cage or cages forward of the beater, and to guide the air current through the upper part of the settling chamber, we propose to use an inlet duct rearward of the beater with a lower bounding wall shaped to run continuously into the rearward end wall of the chamber, and an outlet duct with a lower bounding wall shaped to run continuously into the forward end wall of the chamber in such a manner as to form a "knee" projecting backwards, the upper bounding wall of the duct being formed by the forward portion of the under surface of the beater. This knee serves to effect a separation between the transporting stream and the relatively quiescent region below it, our experiments having shown that with an approximately plane end wall it is impossible to avoid, at large productions, the formation of a downward subsidiary air stream.

The arrangements for the forward delivery of the material will depend upon the desired form of the delivery for example, with cotton, whether it is desired to deliver laps or loose cotton. Thus we might carry the lower bounding wall of the outlet duct to the lower of a pair of cages and carry a boundary from a stripping edge fitted to the beater to the upper of a pair of cages.

Alternatively we might use a single high speed cage according to the method of Patent No. 1,810,675.

One obstacle to the purely automatic transport and cleaning of the material is the powerful localised fan action of the beater, which in machines of the ordinary type, makes it impossible to control the air motions between those grid bars which are in close proximity to the surface of the beater. In our apparatus, where there are no grid bars interposed between the beater and the settling chamber, it may happen that the fan action of the beater is so strong that irregular air motions are projected into the middle and lower regions of the chamber and the determinate character of the transporting air stream thus destroyed. In such a case we propose to shield or "blank off" part of the surface of the beater by means of a curved plate.

One form of our invention is illustrated in Figs. 1 to 4. It consists of a machine arranged to take a feed of cotton in the form of laps and to deliver the opened and cleaned material to a pair of dust cages and thence to a lap-forming mechanism.

In known machines for the cleaning of fibrous materials, for example, cotton, it is very customary to place grids or dirt-bars close to the surface of the beater with the avowed object of preventing cotton from passing into the dirt-box while allowing trash particles to do so. Small tufts of cotton are however liable to pass into the dirt-box, and trash particles initially set free by the action of the beater to be held back by the action of the dirt-bars and re-entangled with the cotton. The forward suction which is employed to transport the cotton may at times serve to recover small tufts which have passed into the dirt-box, but this action is very uncertain since the violent centrifugal action of the beater makes it impossible to maintain an air motion between the dirt-bars consistently in the right direction for this recovery.

We find that it is quite useless to attempt to effect an improvement merely by removing the dirt-bars from an ordinary machine. The dirt-bars enable an ordinary machine to function without absolute failure in spite of imperfect opening of the material by the beater and of entire lack of control of the air flow below the dirt-bars. Large unopened tufts are produced and confined between the beater and the dirt-bars, being simply dragged forward by the beater. In fact, for all sizes of tuft, the pneumatic action of the forward air current is supplemented by the support afforded by the dirt-bars and the direct mechanical forwarding action of the beater. Removal of the dirt-bars leads to a filling of the dirt-box with large tufts of cotton which cannot be carried forward by the unaided action of the air current, so that the machine ceases to function even as a means of transporting the cotton, apart from any question of cleaning it. It is true that this deposition could be prevented by a sufficiently strong forward air current, but this would take along with it the trash particles, and the machine would cease to act as a cleaner.

The problem of producing an improved machine is clearly defined by the above considerations. It is to devise satisfactory co-operating means, the one for producing such good opening of the material that it can be transported by a controlled air current which is not so strong that it will also carry the trash particles; and the other for the pneumatic transport of the well-opened material in such a manner that the trash may fall or be thrown out without meeting with any obstruction, and that no appreciable amount of clean material may be diverted from the main stream by irregular air motions or divergent subsidiary air streams.

In what follows we shall make specific reference to the opening and cleaning of cotton, but it must be understood that in general our remarks will apply to other fibrous material.

The improvements are hereafter further described in detail and illustrated in the accompanying drawings, wherein:—

Fig. 1 is a diagrammatic sectional elevation of an opening machine for opening and cleaning cotton and delivering the same.

Fig. 2 is an enlarged detail view of the feed rollers, cross-rail, adjustable plate, etc.

Fig. 3 shows a modification on Fig. 2.

Fig. 4 is a view showing a way of adjusting the "knee".

Fig. 5 shows how the deflecting plate may be adjusted.

Figure 7:
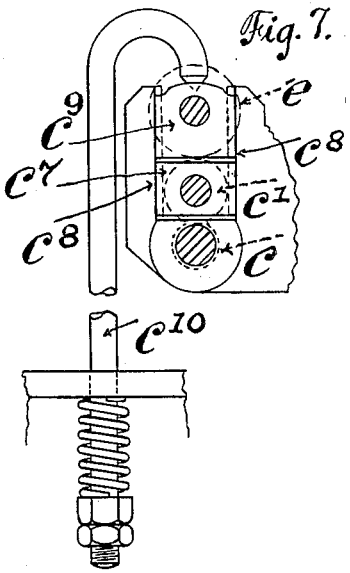

Fig. 7 indicates how such rollers can be weighted.

Figure 8:
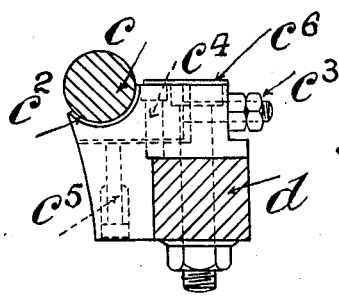
Figure 9:
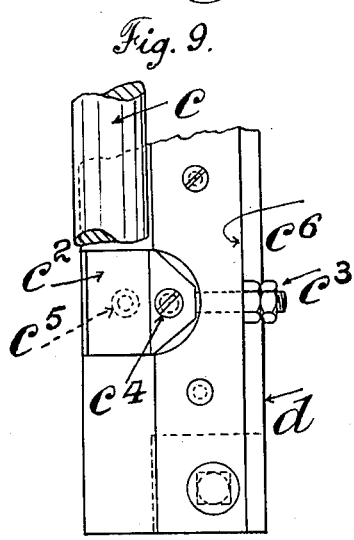

Figs. 8 and 9 show a sectional and a broken plan view of the cross-rail and a way of supporting the lower feed roller.

Figure 10:
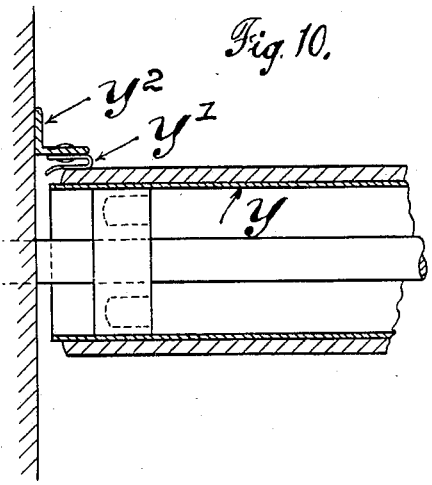

Fig. 10 is a detail view showing the sealing of the selvedges of the trash lattice.

Referring to Fig. 1; $a$ is a feed lattice of ordinary type, and $b$ and $b^1$ are pairs of compressor rollers which serve to compress the cotton before it goes to the actual feed rollers $c$, $c^1$. The rollers $b$ and $b^1$ may be smooth rollers in place of the more usual fluted rollers and we weight them more heavily than is usual in order to compress the sheet of cotton as much as possible and so facilitate its passage through the feed rollers $c$ and $c^1$. Moreover, when dealing with well-opened material produced by a preceding machine of similar type we should use successive drafts between the three pairs of rollers greater than are usual. Thus we might run the feed rollers at a surface speed 20% greater than that of forward pair of compressor rollers and have a similar draft between the two pairs of compressor rollers.

The lower feed roller $c$ preferably rests in spaced cup bearings $c^2$ each removably and adjustably fixed by bolts $c^3$ and screws $c^4$, $c^5$, and a detachable masking plate $c^6$ makes smooth the upper surface of the cross-rail $d$ all as is clear from the detail example according to Figs. 8 and 9.

The upper feed roller $c^1$ is carried in end bearings $c^7$ each of which moves in a vertical slide $c^8$, and a weighting roller $e$, also carried in bearings $c^9$ moving in the same vertical slides, rests on the upper feed roller $c^1$. The bearings of the roller $e$ can be weighted by saddle weighting as suggested at $c^{10}$ and this weighting is transmitted through the weighting roller $e$ to the feed rollers, all as is clearly indicated by the detail view Fig. 7.

By this method of weighting it becomes possible to use feed rollers of such small diameter that ordinary methods of weighting would cause undue bending and even permanent distortion.

Figure 6:
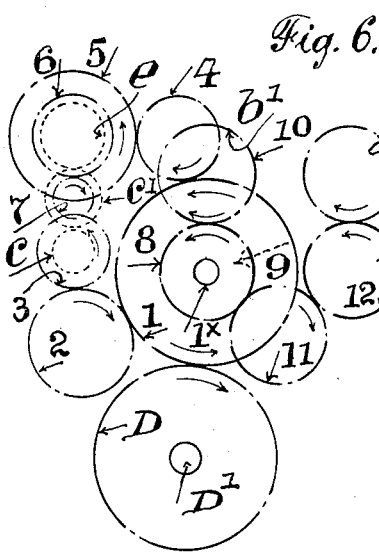
Fig. 6 shows the feed rollers and weighting roller and gear for driving said rollers.

The feed rollers $c$, $c^1$, the pairs of compressor rollers $b$, $b^1$ and the weighting roller $e$ are all advantageously positively driven in suitable manner and preferably by gear wheels from both sides of the apparatus. By way of example, one driving arrangement is indicated diagrammatically at Fig. 6. According to this, the driving gear wheel D on the driven shaft $D^1$ drives gear wheels 1, 2 and 3, and so actuates the feed roller $c$ as to one end. Gear wheel 1 also drives gear wheels 4, 5, 6 and 7, and so actuates weighting roller $e$ and feed roller $c^1$. On the shaft $l^x$ (which gear wheel 1 actuates) is a gear wheel 8 and an inner mangle wheel 9, the mangle wheel 9 driving mangle wheel 10 so that compressor rollers $b^1$ are driven. Gear wheel 8 drives gear wheel 11 which, through the gear wheel 12 and mangle wheels 13 and 14, drives the compressor rollers $b$. There is a similar train of gear wheels on the shafts or axles on the opposite side of the apparatus, except that the driving gear wheel D is not necessary at the opposite end of the apparatus, because the wheel 1 is actuated by the shaft $l^x$. Such a gear drive arrangement means that all the rollers $c$, $c^1$, $b$, $b^1$ and $e$, are positively driven from both sides of the apparatus.

The beater $f$ is clothed with saw-teeth $g$ and the feed roller system is arranged so that the clearance between the teeth and the roller $c$ is very small and the point of closest approach of the teeth to the roller $c$ is slightly above the level of the axis of rotation of the beater. For dealing with a cotton of average staple length of 1" suitable diameters for the rollers would be, for the lower feed roller $c$, 1⅛"; for the upper feed roller $c^1$, 1⅝"; and for the weighting roller $e$, 2½". A suitable diameter for the beater $f$ is 16", and a suitable speed 1600 revolutions per minute. For clothing the beater we should use spirally wound saw-tooth wire, a suitable pitch of the teeth along the wire being ⅕" and a spacing of ⅛" spirally across the width of the beater.

The inlet duct $h$ leads from the rearward end of the machine, underneath the feed lattice, to the region of separation underneath the beater.

The upper boundary sheet $j$ of the duct terminates at the underface $k$ of the cross-rail $d$. Two alternative arrangements of the parts immediately under the cross-rail are shown in Figs. 2 and 3. While the lower feed roller $c$ is set as closely as possible to the beater teeth, say within $\frac{1}{100}''$, the inner face $l$ of the cross-rail $d$ is arranged so that at its lower end it is an appreciable distance from the teeth and a plate $m$ is fixed to the under-face of the cross-rail in such a manner as to be capable of slight adjustment as indicated at $m^1$ in Figs. 2 and 3, in order to vary the size of the gap between its forward edge and the beater teeth. In Fig. 2 the plate $m$ is shown with an approximately horizontal under face, but in Fig. 3 the lower face is curved or shaped at $m^\times$ so as to confine the cotton to the vicinity of the beater teeth for a greater distance.

The lower boundary sheet terminates at the top of the rearward end wall $p$ of the settling chamber $q$, and the end wall and sheet may be formed from a single sheet of metal. The rearward end wall is rearward of the feed rollers and its top end is below the level of the lowest point of the beater surface. The forward end wall $r$ of the settling chamber is concave in cross section to the interior of the chamber, and terminates in a "knee" $s$ and the sheet of metal of which it is formed is bent round to form a boundary $t$ which sheet converges towards the surface of the beater as far as a point a little below the level of the stripping edge $u$ and then bends towards the horizontal and terminates at the lower cage $x$ of a pair of cages. The cross-bar $v$ carrying this stripping edge may have attached to it a deflecting plate whose slope may be adjustable, in some such manner as indicated at Fig. 5, where the plate $w$ is hinged at $w^2$ and slotted lugs $w^3$ are fixed to said plate $w$ and held by bolts $w^4$ passed through the frame sides. Such a plate $w$ acts to deflect the upward stream of cotton towards the nip of the cages $x$ and $x^1$, which serve to condense the cotton and pass it forward to lap-forming mechanism. The suction effect on the cages $x$, $x^1$ can be by fan provision operating in ordinary fashion. A cover $w^1$ prevents the direct access of extraneous air to the cages. We find the deflecting plate $w$ desirable because the well-opened material produced by the machine is liable to be deposited high up on the surface of the upper cage and to be formed into rolls which in the resultant lap give rise to a lack of longitudinal cohesion.

The boundary plates $j$, $n$ and $t$ and the end walls of the settling chamber are fixed to ribs in the sides of the machine in manner to form air-tight connections.

The base of the settling chamber $q$ may be formed by a trash lattice $y$ whose upper surface moves in the direction of the arrow, Fig. 1, so as to deposit the trash underneath the inlet duct. An air-tight connection with the end wall $r$ is made by means of a leather flap $r^1$ at the base of the wall, and with the wall $p$ by means of a positively driven roller $z$ and a leather flap $p^1$ at the base of the wall $p$, said leather flap $p^1$ bearing on the roller $z$. To minimise air leakage along the selvedges of the lattice $y$, the lags of the lattice are made to abut very closely laterally and the frame sides may carry angle-iron members or ribs $y^2$ to which are fixed leather or like packings $y^1$ fashioned to elastically bear about the ends of the lags, as is indicated at Fig. 10. These methods of ensuring substantially air-tight connections are of importance, since it is necessary that there should be no subsidiary air streams to interfere with the determinate character of the transporting air stream.

In order to diminish the fan action of the beater we propose to make use of a member such as $f'$ which "blanks off" a portion of the surface of the beater. In this purpose, according to our invention, we might use a simple curved plate of approximately uniform thickness, but the member $f'$ has been shaped according to the method of Patents 2,062,626 and 2,071,438 whereby the curvature of the stream is increased and a more critical separation of cotton and trash obtained. This member may conveniently extend as shown in Fig. 1 beyond the region of separation. With its use it is possible to increase the beater speed without destroying the determinate character of the flow, and so obtain better opening of the material.

In Fig. 1 the forward end wall $r$ of the settling chamber, the "knee" $s$ and the sheet $t$ are shown as one sheet in a fixed position. An alternative form of construction is shown in Fig. 4, where the upper part of the surface $t$ is fixed and a second or adjustable sheet $t^1$ comprising the lower part of the surface $t$, the "knee" $s$ and the end wall $r$ is adjustable, for example, by slotted brackets $t^2$ and bolts $t^3$ in the side frames. The facing edge or surface of the adjustable sheet $t^1$ is made a close fit to the sheet $t$ and the necessary air-tightness of the adjustable sheet can be obtained by rubber or leather strips bearing on the sides and as an additional precaution the sheet $t$ may be continued down to meet the trash lattice as in Fig. 1 with a "knee" in the most forward and lowest position desired to form a "false" end wall.

We claim:

1. In a machine for the opening and cleaning of cotton and similar fibrous material, a casing having an air inlet duct, a feed mechanism positioned to carry material into the machine, said casing including a settling chamber having a rear wall, a toothed beater cylinder extending across the settling chamber in position to receive the material delivered by the feed mechanism, said duct having an upper boundary wall terminating forwardly adjacent said cylinder and below the feed mechanism, said upper boundary wall extending downwardly and rearwardly from its forward terminus, said vertical rear wall of the settling chamber being located rearwardly of the forward terminus of the upper boundary wall, said duct having a lower boundary wall extending rearwardly and downwardly from the upper edge of said rear wall, said settling chamber having an inwardly projecting cusp below the beater cylinder, a travelling lattice at the base of the settling chamber and means to drive said travelling lattice.

2. The machine of claim 1 having means to seal said travelling lattice with respect to the lower part of the chamber walls.

3. The machine of claim 1 having a cross rail supporting the forward end of the upper boundary wall and flush with the under surface thereof, and said cusp being positioned in the path of the air to separate the air into a lower relatively quiescent portion and an upper relatively rapidly flowing portion.

4. The machine of claim 1 having a cross rail provided on its lower surface with a thin curved plate extending into the duct.

5. The machine of claim 1 having a bar of crescentic section extending longitudinally of and below the beater cylinder with its convex side downwardly.

6. The machine of claim 1 having a cross rail provided on its lower surface with a thin curved plate extending into the duct, said plate being mounted on the rail for adjustment toward and from the beater cylinder and having means to secure the plate in adjusted position.

7. The machine of claim 1 including a suction cage on which material from the machine is collected.

THOMAS CLIFFORD WILLIAMS.
SYDNEY ALFRED SHORTER.